United States Patent [19]

Gozzini et al.

[11] Patent Number: 5,807,971
[45] Date of Patent: Sep. 15, 1998

[54] SELECTIVELY FUNCTIONALIZABLE DESDENDRIMERS

[75] Inventors: Luigia Gozzini; Monica Muttoni, both of Milano, Italy

[73] Assignee: Dibra S.p.A., Italy

[21] Appl. No.: 713,832

[22] Filed: Sep. 13, 1996

[30] Foreign Application Priority Data

Sep. 15, 1995 [IT] Italy ................................ MI95A1929

[51] Int. Cl.⁶ .................................................. C08G 69/26
[52] U.S. Cl. .......................... 528/332; 528/310; 528/328; 528/350; 528/363; 528/373; 528/422; 525/451; 525/410; 525/419; 424/DIG. 16; 514/788
[58] Field of Search ..................... 528/332, 310, 528/328, 350, 363, 373, 422; 525/451, 410, 419; 424/DIG. 16; 514/788

[56] References Cited

U.S. PATENT DOCUMENTS

| | | | |
|---|---|---|---|
| 4,507,466 | 3/1985 | Tomalia | 528/332 |
| 4,568,737 | 2/1986 | Tomalia | 528/332 |
| 4,587,329 | 5/1986 | Tomalia | 528/363 |
| 4,694,064 | 9/1987 | Tomalia | 528/332 |
| 4,737,550 | 4/1988 | Tomalia | 525/418 |
| 4,857,599 | 8/1989 | Tomalia et al. | 525/259 |
| 5,041,516 | 8/1991 | Frechet et al. | 528/44 |
| 5,530,092 | 6/1996 | Meijer et al. | 528/363 |

*Primary Examiner*—Duc Truong
*Attorney, Agent, or Firm*—Nixon & Vanderhye

[57] ABSTRACT

A new class of branched dendrimeric macromolecules, is described essentially consisting of a polyvalent central nucleus and a series of polyoxaalkylene "dendra". Such molecules are characterized by the presense of at least one branch, attached either directly to the "core" or to a "dendron", which does not participate in the growth and which therefor differs from all the other functions of the macromolecule.

19 Claims, 3 Drawing Sheets

SELECTIVELY FUNCTIONALIZABLE DESDENDRIMERS

The present invention concerns a new class of dendrimeric macromolecules composed essentially of a central nucleus and a series of "dendra" which originate at said nucleus and which propagate into the surrounding space, branching in a cascade fashion until the desired form and dimension is attained. Such macromolecules are characterized by having at least one branch, in whichever position, that is different from the others.

BACKGROUND OF THE INVENTION

By means of this/these particular branch/es it is possible, directly or through a suitable "spacer", to conjugate the macromolecules of the present invention with other molecular structures in order to comply with specific uses. For example, the macromolecules of the present invention can be conjugated with molecules that accumulate in specific tissues and organs or recognise appropriate target structures. Such molecules thus function as address molecules. Non-limitative examples of such molecules are: hormones, amino acids, peptides, proteins, enzymes, antibodies, antigens, nucleotides, polysaccharides, sugars, lipids, enzymatic substrates.

Alternatively, through such branches it is possible to link one macromolecule of the present invention with one or more macromolecules of the same class or with some other polyfunctional structures.

Apart from the possible uses of these molecules, the present invention also covers appropriate processes for their preparation.

In order to explain the subject of the present invention as clearly as possible the terms used during the course of the text will now be defined:

"Dendrimers" are macromolecules composed of a series of branched chains, each of which is termed a "dendron". Such dendra depart from a central, polyvalent organic "core" and propagate in a cascade fashion towards the periphery in concentrical levels of successive growth (generations) by means of suitable repetition units. The present invention envisages modified dendrimeric macromolecules containing up to 20 levels, and possibly even more, of growth. It is worth to note that this growth capability is extremely high, well higher than the known dendrimers.

The term "core" refers to the central nucleus of the macromolecule from which the dendra depart. The "core" is an organic residue characterized by a multiplicity r which represents the maximum number of valencies available for attachment of the dendra. As an example, a tetravalent "core" like, for example, a neopentyl residue, would give rise to a dendrimeric molecule characterized by a maximum of four dendra. Consequently, the "core" can be any polyvalent organic residue, whether aliphatic, heterocyclic, aromatic or heteroaromatic.

The term "dendron" refers to each of the branched structures departing from the "core", whose architecture consists of a number of "repetition units", which are repeated sequentially and which are responsible for the cascade growth of the dendron. Each one of these repetition units, apart from the terminal ones, consists of two building blocks, respectively called "lengthening unit" and "branching unit", which are defined hereinafter.

In the present invention, said lengthening units, contrary to the general teaching of the prior-art, are only represented by polyoxaalkylene chains whose length is constant for the same growth level but can vary from level to level, depending on the desired scope.

The term "branching unit" refers to the end part of a repetition unit, that enables the said unit to propagate, at the next level of growth, by at least two other repetition units. Each branching unit derives from a polyvalent organic residue comprising:

a functional group (such as for example halogen, OH, $NH_2$, SH, COOH or a reactive derivative thereof) that is able to link to the lengthening unit of the same growth level;

m reactive residues (at least two) that are able to link to the lengthening units of the next growth level, m representing the branching multiplicity.

The "terminal units" are those belonging to the last growth level or generation of the macromolecule. These terminal units end with functional groups which are usable to link compounds with pre-selected specific activities/roles, for example in the diagnostic or therapeutic field.

In the present invention said functional groups can be linked to the branching units of the terminal units or, in case less superficial functional crowding is desired, even directly to the terminal polyoxaalkylene chains (in this case the terminal branching units do not exist or are formally represented by single bonds).

FIG. 1 shows an example of a "dendron" with branching multiplicity equal to 2. For simplicity the structure is limited to the third level of growth (generation) and no terminal functional groups are disclosed.

Similarly, FIG. 2 shows an example of a "dendron" having branching multiplicity of 3. For simplicity the structure is limited to the second level of growth and no terminal functional groups are disclosed.

Over the past decade dendrimeric macromolecules (see for example Adv. in Dendritic Macromolecules, Vol. 1, 1994, Jai Press, London; Issberner J. et al., Angew. Chem. Int. Ed. Engl., 1994, 33, 2413) have aroused considerable interest because their characteristics differ somewhat from those of common linear or branched polymers obtained through polymerization processes yielding highly polydisperse products. Dendrimers, on the contrary, are obtained by a step-by-step synthetic procedure that enables precise control of their molecular mass, size and form. Dendrimeric molecules, as previously stated, are characterized by the presence of a central nucleus ("core") from which originate chains branching from the centre to the periphery. Branching occurs in such a way as to occupy all the space surrounding the central nucleus. In this way, hyperbranched and dense packed structures are obtained which have a lot of functional groups on the external surface. The above mentioned dense packing phenomenon usually prevents the possibility of obtaining dendrimers of high generation level (Tomalia D. A. et al., Angew. Chem. Int. Ed. Engl., 1994, 29, 138).

One of the more common uses of dendrimers is as carriers of specific molecules, in particular pharmaceuticals and molecules for diagnostic imaging. In such cases it is of particular interest to "label" the conjugation products with molecules that make the use of these derivatives more specific. Examples are the "starburst" conjugates linked to the antibodies described by Tomalia et al. in U.S. Pat. No. 5,338,532. The synthesis of derivatives of this type, however, occurs through a non specific process that does not guarantee the batch-to-batch reproducibility of the molecules obtained. Indeed, a range of substitutions is generally disclosed (see for example Platzek et al. U.S. Pat. No. 5,364,614) rather than an exact number of substitutions. Furthermore, such substitutions could, from time to time, occur on different positions of the dendrimeric macromolecules. Today, the majority of dendrimers are obtained by synthetic processes that guarantee complete and homogenous growth for each growth level. Such processes ensure that each "dendron" in the molecule is without growth "defects" (see for example Tomalia U.S. Pat. No. 4,587, 329).

We have now found, and it is the subject of the present invention, a method for obtaining in a selective way a new class of branched dendrimeric macromolecules, essentially consisting of a polyvalent central nucleus and a series of polyoxaalkylene "dendra". Such molecules are characterized by the presence of at least one branch, attached either directly to the "core" or to a "dendron", which does not participate in the growth and which therefore differs from all the other functions of the macromolecule. We have therefore termed this class of dendrimers, desdendrimers. Desdendrimers shall be defined as dendrimers lacking structurally well defined parts of the parent nominal dendrimers; examples being dendrimers lacking either a complete dendron (desdendrondendrimers) or a specific number of branches (desramodendrimers). Such modification/s introduce an asymmetry into the growth of the molecule. It is therefore possible to utilize this or these residue(s) to conjugate the desdendrimer to, for example, a molecule that is able to accumulate specifically in tissues and organs (address molecule) while using the other terminal functions of the macromolecule to conjugate compounds with preselected specific activities/roles.

Examples of tissue specific molecules are: hormones, amino acids, peptides, proteins, enzymes, antibodies, antigens, nucleotides, polysaccharides, sugars, lipids, enzymatic substrates. Examples of compounds with specific activities/roles include antitumoral drugs and agents for in vivo imaging by radiographic techniques (X rays), nuclear magnetic resonance, scintigraphy and echography.

Alternatively, such residues can be utilized for the preparation of other structures with different objectives in mind.

DESCRIPTION OF THE INVENTION

The present invention concerns desdendrimers with the following general formula (I)

$$C[D]_v[P-S]_z \qquad (I),$$

in which:
C is an organic polyvalent "core", with multiplicity r, where
r is an integer variable between 2 and 10,
v is an integer variable between 1 and r, z is an integer variable between 0 and r−1, where v+z=r,
P is a polyoxaethylene or polyoxapropylene chain of formula

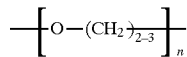

in which n is an integer variable between 0 and 25 with the proviso that, in at least one growth levels, n is different from 0, S is a functional group selected among halogen, OH, SH, $NH_2$, CHO, CN, COOH or salts thereof, and in either free or modified form, or S is a residue deriving from the oxidation or the reduction of one of said functional groups, being S available for the conjugation of the compounds of formula (I) with other molecular structures, in order to confer specific utilities, via the direct formation of a C-heteroatom bond or through the use of a spacer, D is a "dendron" comprising sequentially-linked repetition units of the following structure

—P—B— in which

P is a lengthening unit defined as above and

B is a branching unit deriving from a polyvalent aliphatic residue with branching multiplicity m, being m an integer variable between 2 and 5 and further variable or not from growth level to growth level, and in which the terminal units of the "dendron" correspond to residues of structure

—P—B—T, in which

T is H, or a functional group like halogen, OH, SH, $NH_2$, CHO, CN, COOH whereas said groups are either free, dissociated or undissociated, or modified as an acetal, ketal, ester or ether, in particular pyranylether, thioester, thioether, carbamate, amide and cyclic imide, or as mesyl, tosyl, tresyl, trifluoromethansulphonyl and P and B are defined as above, or B may also be a simple bond, in which case the said terminal units of the "dendron" correspond to residues of structure

—P—T in which P and T are defined as above, with the condition that when z=0, then in at least one of the "dendra" D, at least one of the repetition units —P—B—, in whichever growth levels, is substituted by a residue —P—S, in which D, P, B, and S are defined as above.

Figure 1:
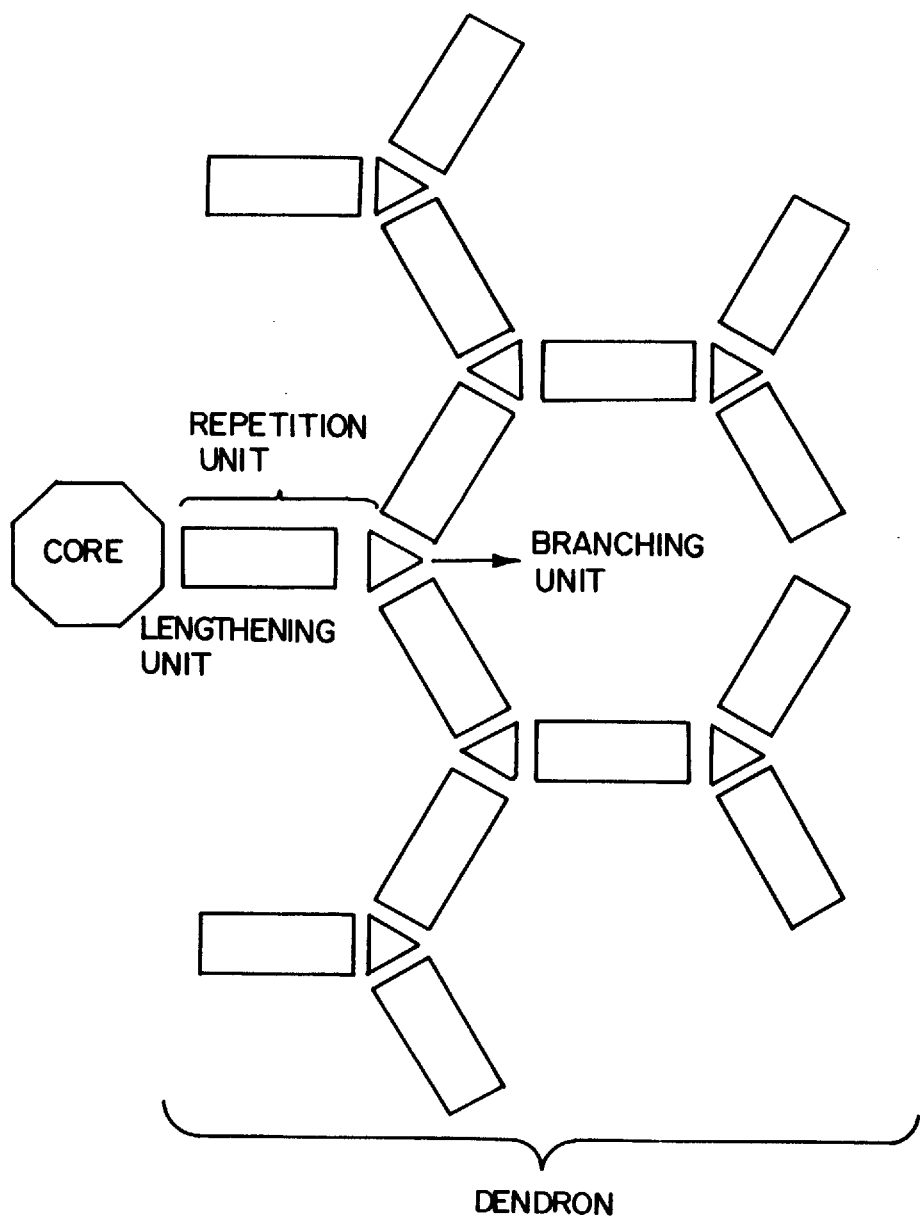
FIG. 1 is a conceptual representation of a denderon of the invention with a multiplicity equal to 2 at the third level of ground and absent terminal functionality groups.
Figure 2:
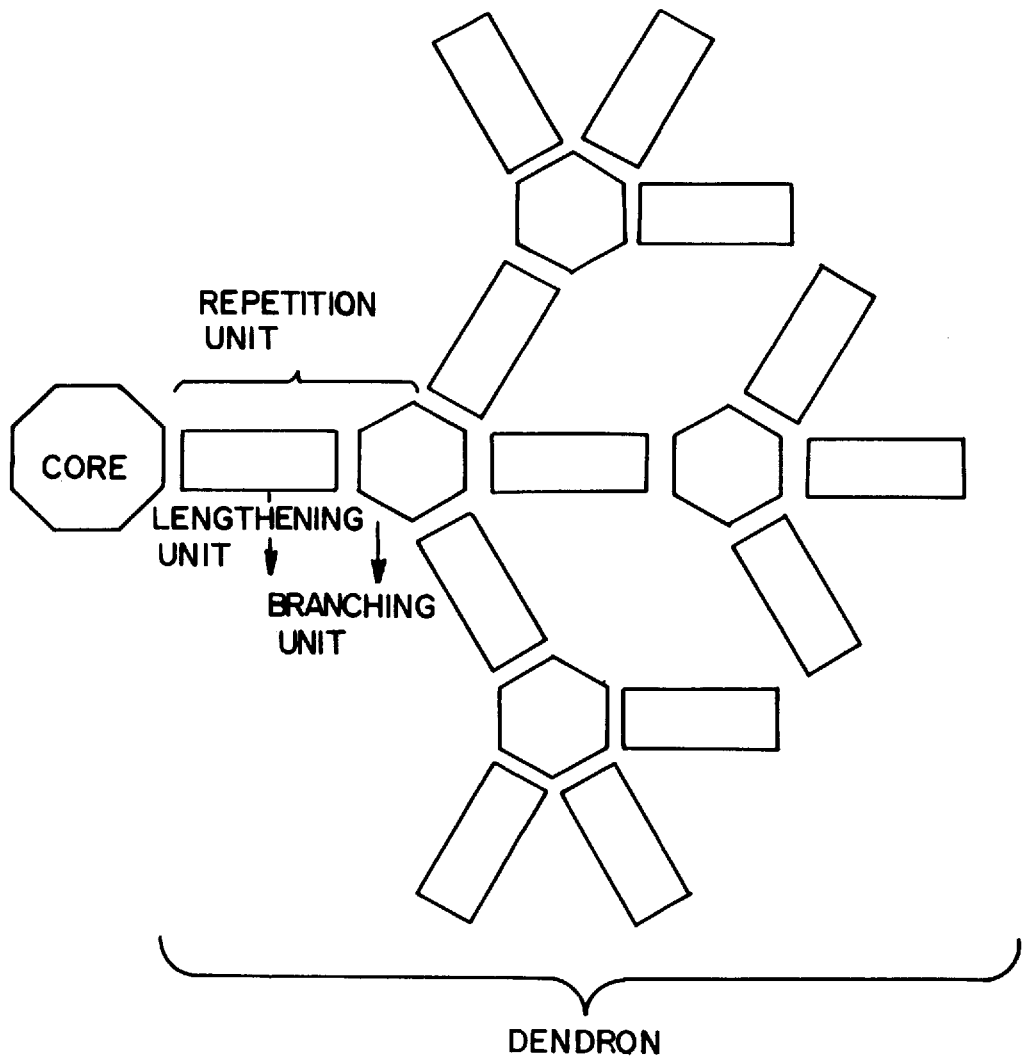
FIG. 2 is a conceptual representation of a denderon of the invention with a multiplicity equal to 3 at the third level of growth and absent terminal functional groups.
Figure 3:
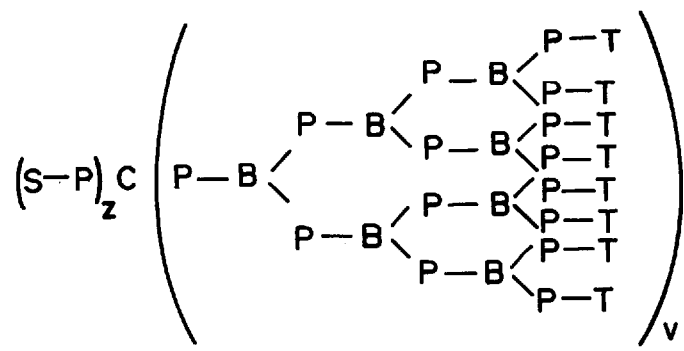
FIG. 3 depicts the schematic structure of a desdendron-dendrimer at the third level of growth.

Covalent conjugates of the desdendrimers with other molecules, which are achieved through the functional group S, are also objects of the invention. As an example, FIG. 3 shows the schematic structure of a desdendrimer of the invention in which z≠0 (desdendrondendrimer). In the scheme the structure is limited to the third growth level.

Figure 4:
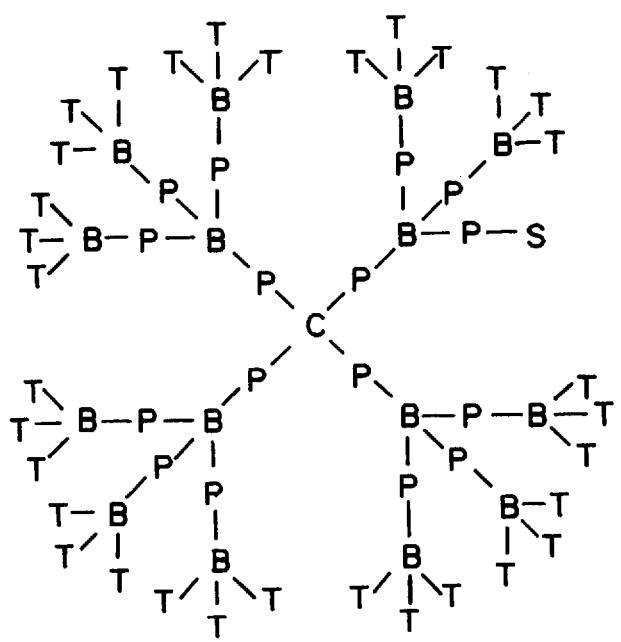
FIG. 4 depicts the schematic structure of a desramodendrimer at the second level of growth.

Analogously, in FIG. 4 the schematic structure of a desdendrimer of the invention is given in which z=0 (desramodendrimer). In this case the structure is limited to the second growth level.

Examples of preferred "cores" are the following polyvalent residues:

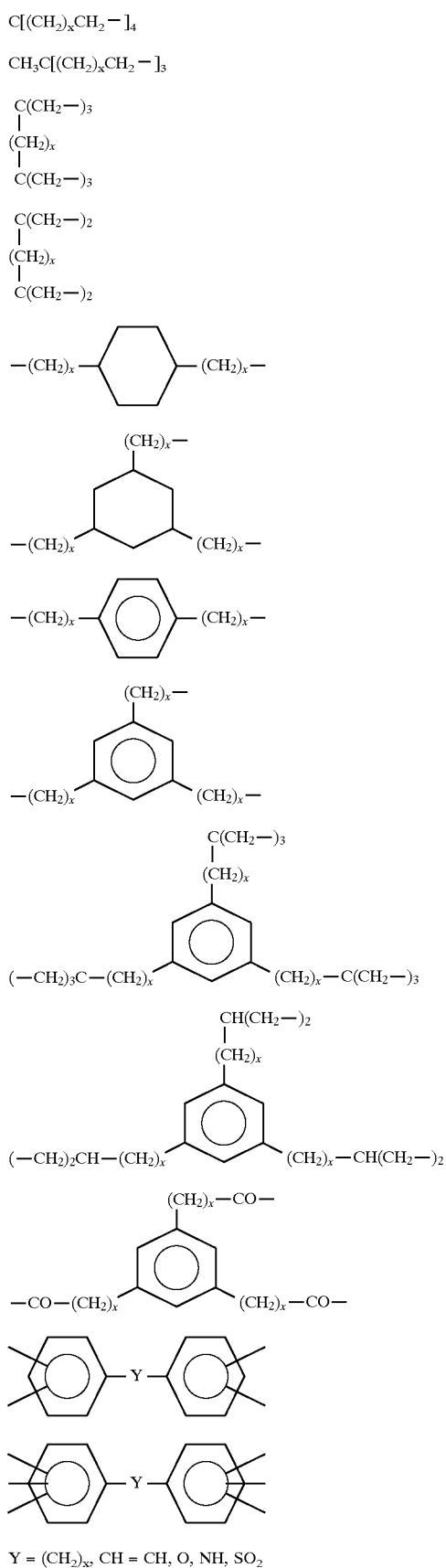
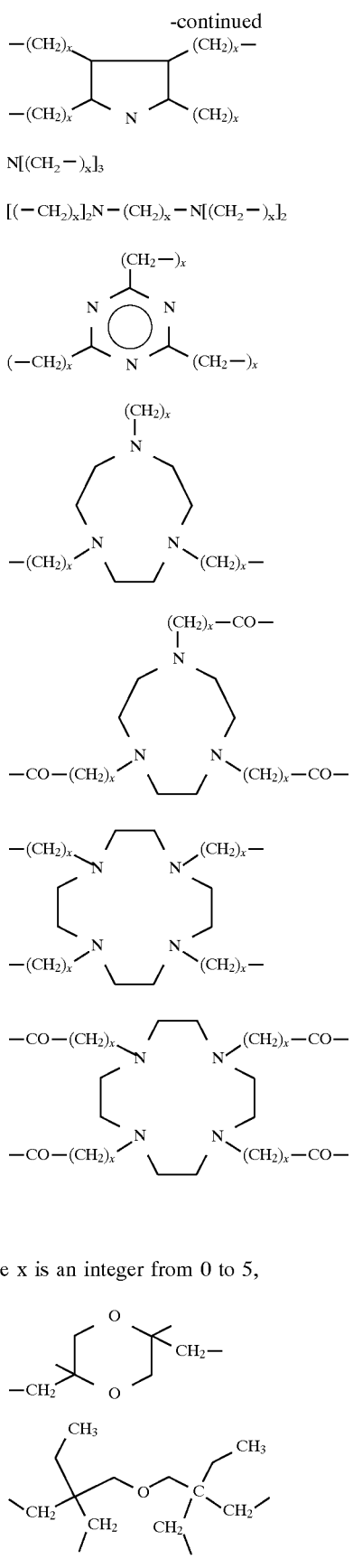
where x is an integer from 0 to 5,

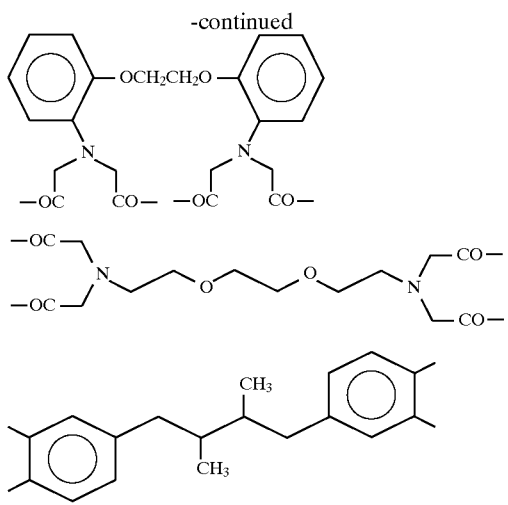

Examples of preferred S groups are halogen, OH, SH, NH$_2$, CHO, CN, COOH and their salts. Such groups can either be free or modified. Particularly preferred modifying groups are protecting groups such as acetal, ketal, ester or ether of which methylthiomethylether, 2-methoxyethoxymethylether, tetrahydrothiofuranylether, thioester, thioether, carbamate, amide or cyclic imide. Further modifying groups can be selected among activating groups such as tosyl, SO$_2$CH$_3$, SO$_2$CH$_2$CF$_3$, SO$_2$CF$_3$. S can also be a residue deriving from the oxidation or reduction of one of said functional groups. Preferably it can be a group of formula

in which X is CHO, COOH, CN or derivative thereof.

Molecules that can be conjugated to desdendrimers of the present invention by means of the S function are those able to accumulate in a specific manner in tissues and organs or which are able to recognise target structures and thus act as address molecules. Examples of preferred molecules of this type are: hormones, amino acids, peptides, proteins, enzymes, antibodies, antigens, nucleotides, polysaccharides, sugars, lipids, enzymic substrates. Other preferred example of molecules that can be conjugated to the desdendrimers of formula (I) by means of the S function are selectable among the following list: glucosamine, tryptophan, glutamine, 4-aminobutyric acid, histamine, serotonin, dopamine, adenine, phosphatidylethanolamine, angiotensin, Leuenkephalin, substance P, methyltryptophan, retinol, glucose. Other preferred molecules that can be conjugated to desdendrimers of the present invention are those of formula (I).

The conjugation of the desdendrimers of formula (I) with the a.m. molecules is obtained by reacting the S group/s with a suitable active function of the other molecule with the direct formation of a C-heteroatom bond. Said conjugation can also be obtained interposing a suitable spacer between the two molecules.

Particularly preferred desdendrimers are those in which:
z=1
v=3
the "core" C is a neopentyl residue of formula:

each generation, apart from the last, is constituted by a residue of formula

in which
P' is a polyoxaethylene residue of formula:

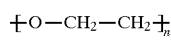

in which n is an integer from 0 to 15, with the proviso that in at least one growth level, n is different from 0,
B' is a branching unit, having a branching multiplicity of 2 or 3, of formula:

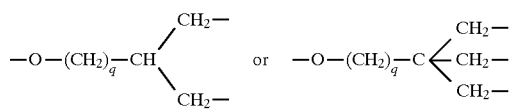

in which q is an integer variable between 0 and 4, and
in which
the final growth level comprises residues of formula:

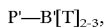

in which T is defined as above and B' may also be a simple bond, in which case the final growth level comprises residues of formula:

S is one of the groups: halogen, CHO, CN, COOH, NH$_2$, OH, OTs, OSO$_2$CH$_3$, OSO$_2$CH$_2$CF$_3$, OCH$_2$CHO, OCH$_2$COOH, OCH$_2$CN.

Equally preferred desdendrimers are those in which
z=0
v=4
the "core" C is a neopentyl residue of formula:

three of the "dendra" D are made up of repetition units of structure

and of final growth level units of structure

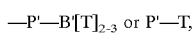

in which P', B' and T are defined as above, and
one "dendron" D includes, in whichever position of the same, at least one residue

in which P' and S are defined as above.

Other preferred desdendrimers according to the present invention include those belonging to the following classes:
Class I

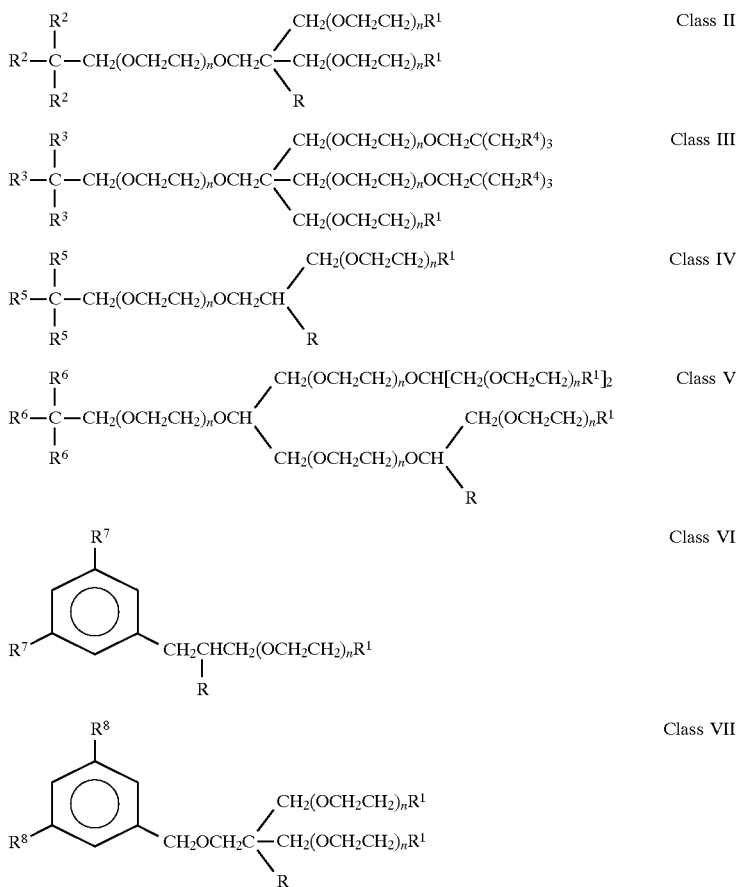

where n=0–6

R = $CH_2OH$, $CH_2OSO_2CH_3$, $CH_2OSOCH_2CF_3$, $CH_2OSO_2CF_3$, $CH_2OTs$, CHO, COOH, $CH_2CN$, $CH_2SH$, $CH_2NH_2$, CN, $R^1$ = halogen, OH, O-pyranyl, OTs, $NH_2$, CN, SH, $OCH_2CHO$, $OCH_2COOH$, $R^2 = CH_2(OCH_2CH_2)nOCH_2C[CH_2(OCH_2CH_2)_nR^1]_3$ $R^3 = CH_2(OCH_2CH_2)nOCH_2C[CH_2(OCH_2CH_2)_nOCH_2C(CH_2R^4)_3]_3$ $R^4$ = H, orthoester, $R^1$ $R^5 = CH_2(OCH_2CH_2)nOCH_2CH[CH_2(OCH_2CH_2)_nR^1]_2$ $R^6 = CH_2(OCH_2CH_2)nOCH[CH_2(OCH_2CH_2)nOCH[CH_2(OCH_2-CH_2)_nR^1]_2]_2$ $R^7 = CH_2CH[CH_2(OCH_2CH_2)_nR^1]_2$ $R^8 = CH_2OCH_2C[CH_2(OCH_2CH_2)_nR^1]_3$ The desdendrimers of the present invention can be used for all the known possible applications of the dendrimeric compounds. In particular, they are particularly useful for the preparation of pharmaceutical and diagnostic compositions for human and animal use, preferably compositions selective for specific organs and tissues. Preferred diagnostic formulations are those for in vivo imaging techniques such as nuclear magnetic resonance, nuclear medicine, radiology.

The desdendrimers of the present invention can be obtained through synthetic steps that are appropriate to the class of derivatives desired. One of the preferred processes for obtaining the above compounds involves essentially the following steps:

Sequence A (usable in case z=0)

a) reaction of the reactive functions of the "core" with polyoxaalkylene lengthening units, in which said polyoxaalkylene chains have one end functionalized with reactive groups that are able to react with the "core", forming C—O bonds with the same, while the terminal group(s) of the opposite end are suitably protected, being this reaction performed in such a way that at least one of the reactive groups of the "core" does not participate in the lengthening;

b) blocking of the "core" residue/s that have not participated in the lengthening with a suitable modification or protection (alternatively said residue/s can be selectively protected or modified before introducing the polyoxaalkylene chains according to step a));

c) selective deprotection of the terminal groups of the polyoxaalkylene chains, and reaction of these, either as they are or following activation, with a reactive group of a branching unit, in which the other reactive functions are suitably protected;

d) selective deprotection of these protected functions of the branching unit and subsequent reaction with the polyoxaalkylene units of the successive growth level;

e) repetition of steps c) and d) by using the most properly selected polyoxaalkylene chains and branching units, until the desired desdendrondendrimer is obtained;

f) deprotection and possible subsequent functionalization of the unreacted group/s of point b), directly or via a spacer, with the desired address molecules or with at least another molecule of formula (I).

Another preferred process consists of the following steps:

Sequence B (usable in case z=0)

a) reaction of all the reactive functions of the "core" with the desired polyoxaalkylene lengthening units in which said polyoxaalkylene chains have one end functionalized with reactive groups that are able to react with the "core", forming C—O bonds with the same, while the terminal group/s of the opposite end are suitably protected, b) deprotection of the terminal groups of the polyoxaalkylene chains, and reaction of these, either as they are or following activation, with a reactive group of a branching unit in which the other reaction functions are suitably protected;

c) deprotection of these functions and subsequent reaction with the polyoxaalkylene units of the successive growth level;

d) repetition of steps b) and c) until the desired desramodendrimer is obtained, with the condition that at least one of the terminal groups of the lengthening units of the branching units, at whichever growth level, does not participate in the growth and is possibly suitably blocked by means of modification or protection;

e) deprotection and possible subsequent functionalization of the group/s that have not participated in the growth, analogously to a.m. step f) of Sequence A.

DESCRIPTION OF THE PREFERRED EMBODIMENTS

The preferred experimental conditions result very clearly from the following experimental examples.

EXAMPLE 1

Preparation of chlorooxvethylene chains with hydroxyl functions Protected with dihydropyran The following products were prepared according to the procedure described in WO 95/25763, Example 1:

AI 2-(2-chloroethoxy)oxane ($C_7H_{13}ClO_2$)
AII 2-(3-oxa-5-chloropentyloxy)oxane ($C_9H_{17}ClO_3$)
AIII 2-(3,6-dioxa-8-chlorooctyloxy)oxane ($C_{11}H_{21}ClO_4$).

TABLE I

| | Preparation of chlorooxyethylenepyranyl derivatives | | |
|---|---|---|---|
| Product | Starting chloroalcohol | e.p. (pressure) | Reaction yield |
| AI | $ClCH_2CH_2OH$ | 100° C. (2676 Pa) | 85% |
| AII | $ClCH_2CH_2OCH_2CH_2OH$ | 85° C. (60 Pa) | 91% |
| AIII | $ClCH_2CH_2OCH_2CH_2OCH_2CH_2OH$ | 125° C. (60 Pa) | 80% |

EXAMPLE 2

Preparation of macromolecules of formula (I) with z=1 and neopentyl "core" (desdendrondendrimers)

Pentaerythritol (0.045 mol) was dissolved in 19.06M NaOH (1.8 mol). The solution was heated to 65° C. and stirred for 1 h under $N_2$. Chloroxyethylenepyranyl derivative AII (0.27 mol), obtained as described in Example 1, and tetrabutylammonium bromide (0.018 mol) were added and the mixture was reacted for 144 h at 65° C. After cooling to room temperature, the reaction mixture was diluted with $H_2O$ and extracted with diethylether. The organic layers were combined, washed with $H_2O$, dried over $Na_2SO_4$ and concentrated under vacuum. The crude reaction mixture was submitted to fractional distillation and then purified by column chromatography. By this method, the following product was obtained:

B1 1,15-di(oxan-2-yl-oxy)-8-hydroxymethyl-8-[7-(oxan-2-yl-oxy)-2,5-dioxaheptyl]-3,6,10,13-tetraoxapentadecane ($C_{32}H_{60}O_{13}$).

The reaction yield and starting products are listed in Table II.

TABLE II

| | Alkylation reaction | | |
|---|---|---|---|
| Product | Starting chlorooxyethylenepyranyl | Starting tetraalcohol | Reaction yield |
| BI | 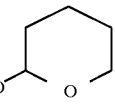 | $C(CH_2OH)_4$ | 50% |

The elemental analysis and the $^1$H-NMR, $^{13}$C-NMR and mass spectra were in agreement with the proposed structure.

Similar results were obtained when the following products were used as chloropyranyl derivatives: $ClCH_2CH_2O$-pyranyl (AI) and $ClCH_2CH_2OCH_2CH_2OCH_2CH_2O$-pyranyl (AIII).

EXAMPLE 3

Preparation of macromolecules of formula (I) with z=0, neopentyl "core" and branching multiplicity=3 (desramodendrimers)

The branched starting alcohol (see Table III) (0.0073 mol), obtained according to the method described in patent application WO 95/25763, Example 8, was dissolved in 19.06M NaOH (0.88 mol). The mixture was warmed up to 65° C. and vigorously stirred for 1 h under N2 atmosphere. Tetrabutylammonium hydrogensulphate (0.0029 mol) and the chlorooxyethylenepyranyl derivative AII (0.131 mol) obtained as described in Example 1, were added. After stirring at 65° C. for 8 d, the reaction mixture was cooled to room temperature, diluted with $H_2O$ and extracted with $CH_2Cl_2$. The organic layers were combined, dried over $Na_2SO_4$, filtered and evaporated to dryness under vacuum. The crude reaction product was purified over a silica gel column. By this method, the following product was obtained CI 18-[10-(hydroxymethyl)-17-(oxan-2-yl-oxy)-10-(7-(oxan-2-yl-oxy)-2,5-dioxaheptyl)-2,5,8,12,15-pentaoxaheptadecyl]-1,35-di(oxan-2-yl-oxy)-8,8,28,28-tetrakis[7-(oxan-2-yl-oxy)-2,5-dioxaheptyl]-18-[17-(oxan-2-yl-oxy)-10,10-bis(7-(oxan-2-yl-oxy)-2,5-dioxaheptyl)-2,5,8,12,15-pentaoxaheptadecyl]-3,6,10,13,16,20,23,26,30,33-decaoxapentatriacontane ($C_{140}H_{260}O_{57}$).

The reaction yield and starting products are listed in Table III.

TABLE III

Alkylation reaction

| Product | Starting product | Pyranyl derivative | Reaction yield |
|---|---|---|---|
| CI | C[CH$_2$OCH$_2$CH$_2$OCH$_2$CH$_2$OCH$_2$C(CH$_2$OH)$_3$]$_4$ | 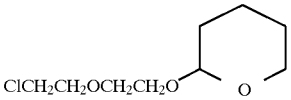 | 50% |

The elemental analysis and the $^1$H-NMR, $^{13}$C-NMR and mass spectra were in agreement with the proposed structure.

Similar results were obtained when the following products were used as chloropyranyl derivatives:

ClCH$_2$CH$_{2O}$-pyranyl (AI) and ClCH$_2$CH$_2$OCH$_2$CH$_2$OCH$_2$CH$_2$O-pyranyl (AIII).

EXAMPLE 4

Preparation of desramodendrimers with neopentyl "core" and branching multiplicity=2

Using the procedure described in the preceeding Example 3, with starting alcohols obtained following the general teaching of WO 95/25763, and alkylating agents obtained by the method described in Example 1, class IV and V desramodendrimers were prepared according to the following reaction schemes:

Class IV

C[CH$_2$(OCH$_2$CH$_2$)$_2$OCH$_2$CH(CH$_2$OH)$_2$]$_4$ +

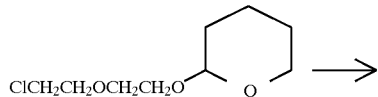 →

Class V

C[CH$_2$(OCH$_2$CH$_2$)$_2$OCH[CH$_2$(OCH$_2$CH$_2$)$_2$OCH(CH$_2$OH)$_2$]$_2$]$_4$

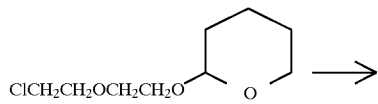 →

EXAMPLE 5

Preparation of desdendrimers of formula (I) with aromatic "core"

Class VI and VII derivatives with aromatic "cores" were obtained by using one of the synthetic procedures described in Examples 2 or 3 (depending on the product) and by keeping the molar ratios of the reagents analogous.

EXAMPLE 6

Preparation of class III desdendrimers of the present invention

The class III product with n=2 was prepared by phase transfer catalysis reaction, using tetrabutylammonium hydrogensulphate as catalyst according to the following scheme:

C[CH$_2$(OCH$_2$CH$_2$)$_2$OCH$_2$C[CH$_2$(OCH$_2$CH$_2$)$_2$OH]$_3$]$_4$ +

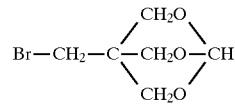

The same product was also obtained according to the following scheme:

C[CH$_2$(OCH$_2$CH$_2$)$_2$OCH$_2$C[CH$_2$(OCH$_2$CH$_2$)$_2$OTs]$_3$]$_4$ +

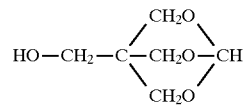

where Ts=tosyl.

The starting products were obtained according to the method described in WO 95/25763, Example 12b.

The corresponding polyalcohol derivative was obtained by hydrolysis in MeOH.

EXAMPLE 7

Functionalization of the free hydroxyl groups of desramodendrimers with 11 suitably protected polyoxaethylene chains The starting product (see Table IV) (0.0007 mol), obtained according to the method described in Example 3, was dissolved in CH$_2$Cl$_2$ (5 mL); triethylamine (0.00105 mol) was added and the reaction temperature cooled to −10° C. The desired sulphonylchloride was then added (see Table IV) (0.00077 mol). After reacting the mixture at −10° C. for 3 h and at room temperature for 14 h, triethylamine (0.00052 mol) and the desired sulphonylchloride (0,00039 mol) were once again added. The reaction temperature was raised to 40° C. and the mixture reacted for 3 h. The reaction mixture was cooled and washed with H$_2$O, dried over Na$_2$SO$_4$, filtered and evaporated to dryness. The crude reaction product was finally purified by column chromatography. By this method the following products were obtained DI 18-[10-(mesyloxymethyl)-17-(oxan-2-yl-oxy)-10-(7-(oxan-2-yl-oxy)-2,5-dioxaheptyl)-2,5,8,12,15-pentaoxaheptadecyl]-1,35-di(oxan-2-il-ossi)-8,8,28,28-tetrakis[7-(oxan-2-yl-oxy-2,5-dioxaheptyl]-18-[17-(oxan-2-yl-oxy)-10,10-bis(7-(oxan-2-yl-oxy)-2,5-dioxaheptyl)-2,5,8,12,15-pentaoxaheptadecyl]-3,6,10,13,16,20,23,26,30,33-decaoxapentatriacontane (C$_{141}$H$_{26}$2O$_{59}$S)

DII 1,35-di(oxan-2-yl-oxy-8,8,28,28-tetrakis[7-(oxan-2-yl-oxy)-2,5-dioxaheptyl]-18-[17-(oxan-2-yl-oxy)-10,10-bis(7-(oxan-2-yl-oxy)-2,5-dioxaheptyl)-2,5,8,12,15-pentaoxaheptadecyl]-18-[10-

(trifluoroethanesulphonyloxymethyl)-17-(oxan-2-yl-oxy)-10-(7-(oxan-2-yl-oxy)-2,5-dioxaheptyl)-2,5,8,12,15-pentaoxaheptadecyl]-3,6,10,13,16,20,23,26,30,33-decaoxapentatriacontane ($C_{142}H_{262}F_3O_{59}S$).

The reaction yield and starting products are listed in Table IV.

and a solution of $CrO_3$ (0.007 mol) in 10 mL DMSO was added. The reaction mixture was stirred at room temperature overnight, then diluted with $H_2O$ and extracted with $CH_2Cl_2$. The organic layer was evaporated after drying over $Na_2SO_4$ and the following product was obtained as an oil $$OHCC[CH_2(OCH_2CH_2)_2O\text{-pyranyl}]_3 \qquad (EI)$$

TABLE IV

Functionalization reaction

| Product | Starting alcohol | Chlorosulphonyl derivative | Reaction yield |
|---|---|---|---|
| DI | 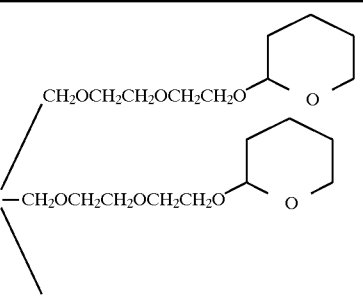 | $CH_3SO_2Cl$ | 70% |
| DII | 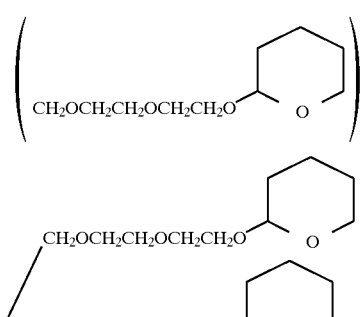 | $CF_3CH_2SO_2Cl$ | 75% |

The elemental analysis and the $^1$H-NMR, $^{13}$C-NMR and mass spectra were in agreement with the proposed structure.

The same procedure was adopted to functionalize hydroxyl groups of other products belonging to other classes described in the present invention.

EXAMPLE 8

Oxidation of free hydroxyl groups of desdendrimers of the present invention having suitably protected polyoxaethylene chains a) The starting alcohol BI (0.0035 mol), obtained as described in Example 2, was solubilized in DMSO (50 mL)

b) Alternatively, the same product was obtained by treatment of the corresponding starting alcohols by pyridinium chlorochromate in $CH_2Cl_2$. Following the procedures described in a) or b), —$CH_2OH$ groups of other products belonging to other classes described in the present invention were oxidized to the corresponding aldehyde derivatives.

In particular following the procedure a), the alcohol derivative CI, obtained as described in Example 3, was converted in the corresponding aldehyde derivative of formula

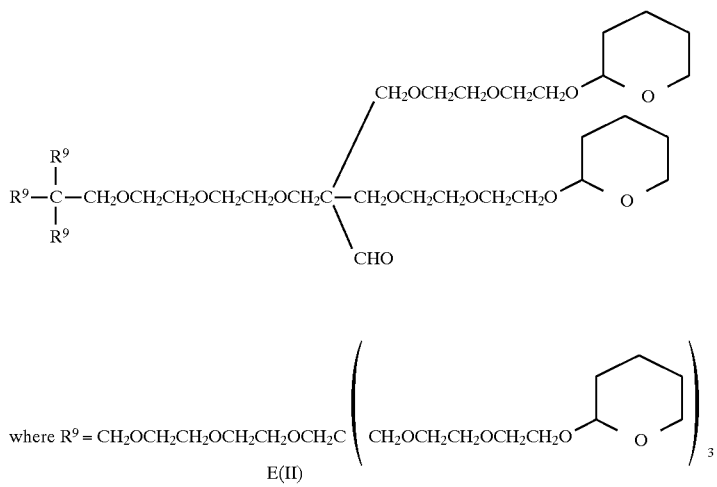

where R⁹ = CH₂OCH₂CH₂OCH₂CH₂OCH₂C

E(II)

The elemental analysis and mass spectra were in agreement with the proposed structure.

EXAMPLE 9

Conjugation of the desdendrimers of the invention with amine-containing derivatives a) The DII tresyl derivative (0.00016 mol), obtained as described in Example 7, was dissolved in DMSO (5 mL); benzylamine (0.0003 mol) and NaI (0.00003 mol) were added to the solution and the reaction mixture was stirred for 14 h at 50° C. Then benzylamine (0.0003 mol) and NaI (0.00003 mol) were added again. The reaction mixture was stirred at 50° C. for 14 h and then cooled at room temperature, taken up with H₂O (20 mL) and extracted with EtOAc (3×10 mL). The organic layers were combined, dried over Na₂SO₄, filtered and concentrated under reduced pressure. The crude product was purified by column chromatography using a mixture of EtOAc/acetone 75/25 (v/v) as eluent.

The following conjugation product was obtained

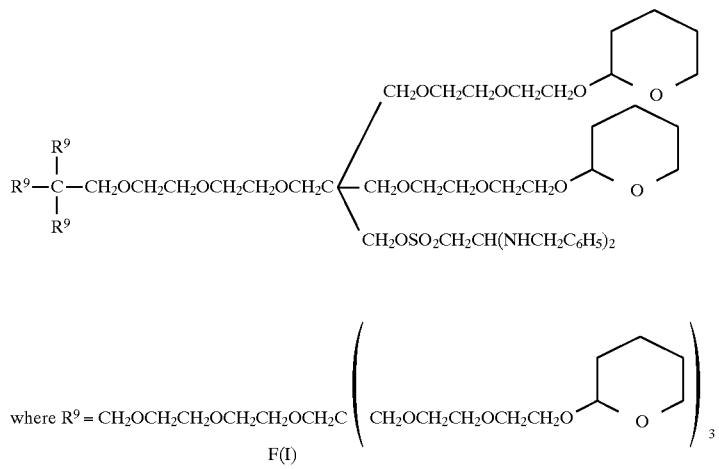

where R⁹ = CH₂OCH₂CH₂OCH₂CH₂OCH₂C

F(I)

The elemental analysis and mass spectra were in agreement with the proposed structure.

The product was then dissolved in a mixture of CH₂Cl₂/MeOH 1/1 (v/v) (10 mL), 37% (w/w) HCl (0.3 mL) was added and the solution was stirred for 3 h at room temperature. Subsequently, NaHCO₃ was added to neutral pH, the inorganic salts were filtered off and the organic layer dried over Na2SO4. The solvent was then removed under vacuum and the crude product was purified by column chromatography using a mixture of CH$_3$CN/H$_2$O 7/3 (v/v) as eluent.

The following product was obtained

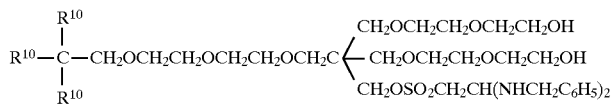

where

   F(II)

The elemental analysis and the $^1$H-NMR, $^{13}$C-NMR and mass spectra were in agreement with the proposed structure.

Following the same procedure the DII tresyl derivative was reacted with histamine to give product F(III) which after deprotection gave product F(IV).

where

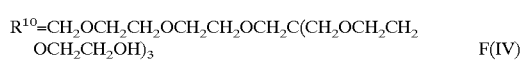   F(IV)

b) The aldehyde derivative EII (0.0035 mol) obtained as described in Example 8b was dissolved in DMSO (50 mL) and Na-Z-L-lysine (0.0035 mol) and NaBH$_3$CN (0.007 mol) were added. After 24 h at room temperature, the reaction mixture was worked up to give the following product

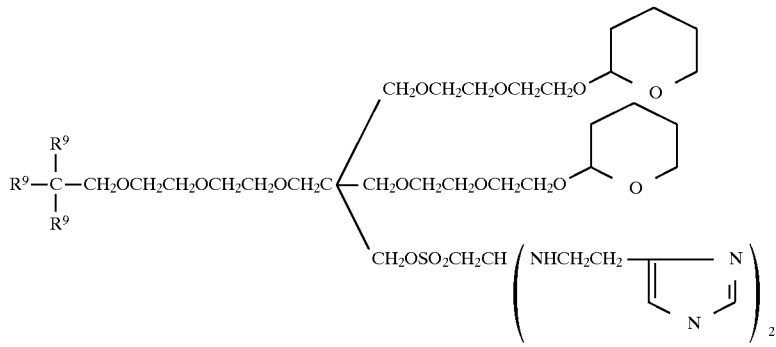

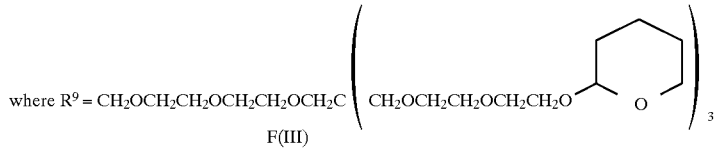

F(III)

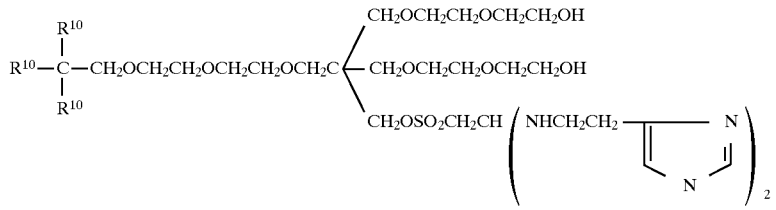

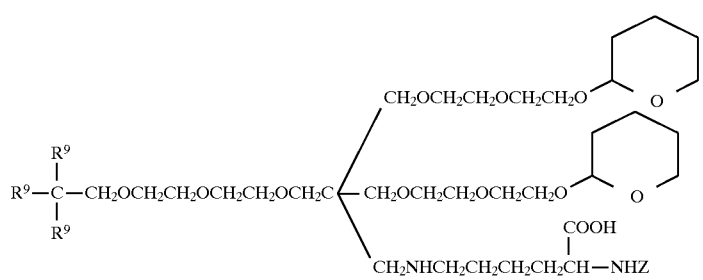

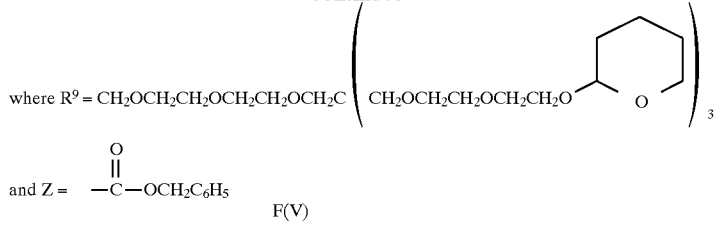

where $R^9 = CH_2OCH_2CH_2OCH_2CH_2OCH_2C(CH_2OCH_2CH_2OCH_2CH_2O\text{-THP})_3$ and $Z = -\overset{O}{\underset{\|}{C}}-OCH_2C_6H_5$

F(V)

The elemental analysis and mass spectra were in agreement with the proposed structure.

Following the same procedure, the aldehyde derivative EII was reacted with either dopamine or serotonin to give product F(VI) and F(VII), respectively.

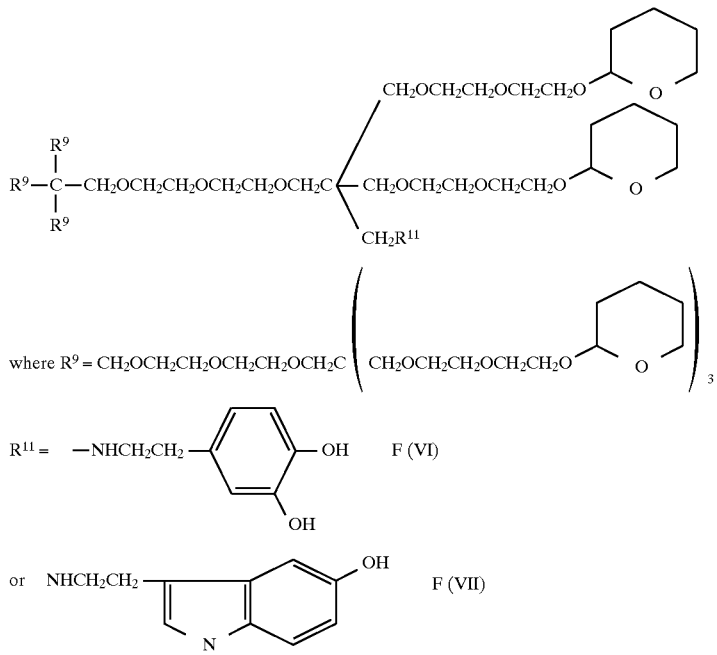

where $R^9 = CH_2OCH_2CH_2OCH_2CH_2OCH_2C(CH_2OCH_2CH_2OCH_2CH_2O\text{-THP})_3$ $R^{11} = -NHCH_2CH_2-\text{(3,4-dihydroxyphenyl)}$  F (VI)

or $NHCH_2CH_2-\text{(5-hydroxyindol-3-yl)}$  F (VII)

The corresponding deprotected products are obtained by acid deprotection as described above.

EXAMPLE 10
Conjugation of desdendrimers of the present invention with hydroxyl-containing derivatives 60% NaH (0.00035 mol) was suspended in anhydrous THF (20 mL) tetraethylene glycol (0.0003 mol) was added to the suspension and the mixture stirred for 2 h at room temperature. Then the DII tresyl derivative (0.0003 mol), obtained as described in Example 7 was added and the reaction mixture stirred overnight at room temperature, then the solvent was distilled under reduced pressure and the residue taken up with $H_2O$ and extracted with EtoAc.

After the work up of the crude material, the conjugation product of tetraalkyleneglycol to the desdendrimer was obtained.

EXAMPLE 11
Dimerization of desdendrimers of formula (I) via the use of a spacer 60% NaH (0.0004 mol) was suspended in anhydrous THF (25 mL). Polyethylenglycol 1000 (0.00015 mol) was added to the suspension and the mixture stirred for 3 h at room temperature. Then the DII tresyl derivative (0.0003 mol), obtained as described in Example 7 was added and the reaction mixture stirred overnight at room temperature. The solvent was distilled under reduced pressure and the residue taken of with $H_2O$ and extracted with $CH_2Cl_2$. After purification of the crude product the dimer of the desdendrimer was obtained.

We claim:

1. A dendrimeric composed of a central nucleus having a plurality of branches propagating from the nucleus macromolecule has the formula (I):

$C[D]_v[P-S]z$  (I)

and optionally also a polyoxaethylene or propylene chain coupled to a functional group, in which:

C is an organic polyvalent core, with multiplicity variable r between 2 and 10, v is an integer variable between 1 and r, z is an integer variable between 0 and 4-1, provided v+z=r;

P is a polyoxaethylene or polyoxapropylene chain of the formula:

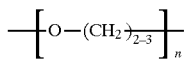

in which n is an integer variable between 0 and 25 provided that is at least one growth level, n is different from 0;

S is a free or modified functional group selected from halogen, OH, SH, $NH_2$, CHO, CN, COOH or salts thereof, of S is a residue of an oxidized or reduced functional group, S conjugating the compounds of formula (I) with other molecular structures via a direct C-hetroatom bond or through a spacer, D is a dendron comprising sequentially-linked repetition units of the structure:

—P—B— in which

P is as defined above, and

B is a branching unit of a polyvalent aliphatic residue with branching multiplicity m, in which m is an integer variable between 2 and 5 which may vary from growth level to growth level, wherein the terminal units of the dendron are residues of the structure:

—P—B—T in which P and B are as defined above and

T is H, or a functional group selected from halogen, OH, SH, $NH_2$, CHO, CN, COOH or when B is a direct bond, the terminal units of the dendron are of the formula:

—P—T in which P and T are defined as above, provided that when z=0, then in at least one of the dendra D or at least one of the repetition units —P—B— is substituted by —P—S, in which D, P, B and S are defined as above, or covalent conjugates thereof.

2. The core according to claim 1 in which the "core" C is the central nucleus deriving from an organic polyvalent open-chained aliphatic compound that is branched or not, or which is alicyclic or heterocyclic, aromatic or heteroaromatic.

3. The core according to claim 2 in which the "core" C is selected from the following residues:

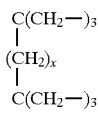

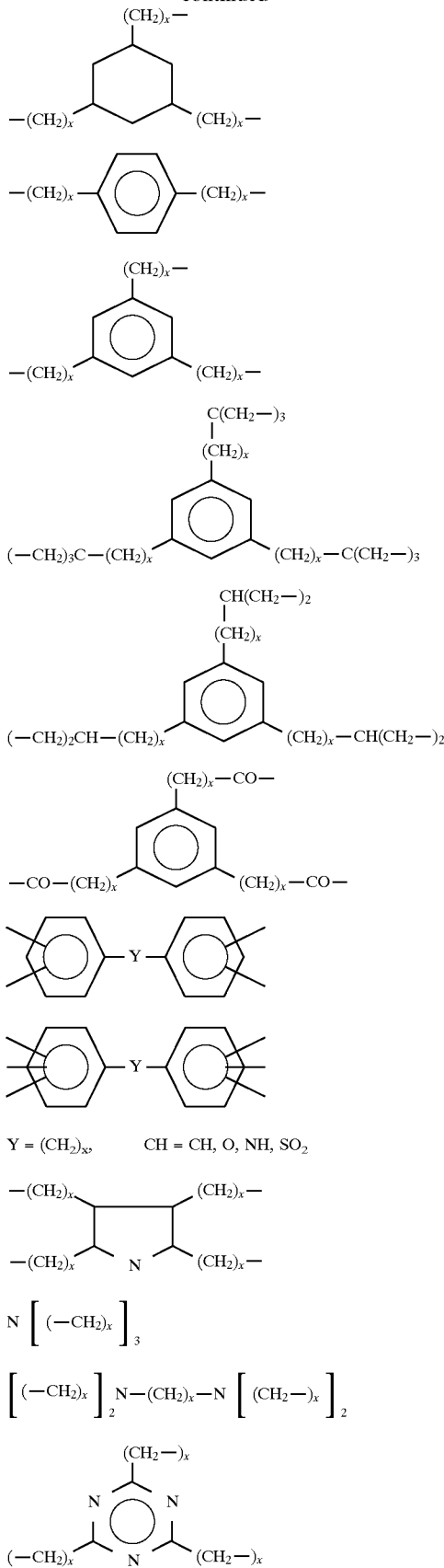

-continued

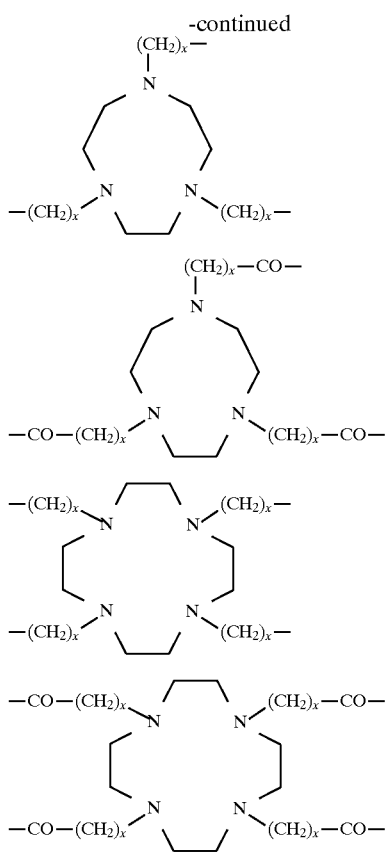

where x is an integer variable from 0 to 5

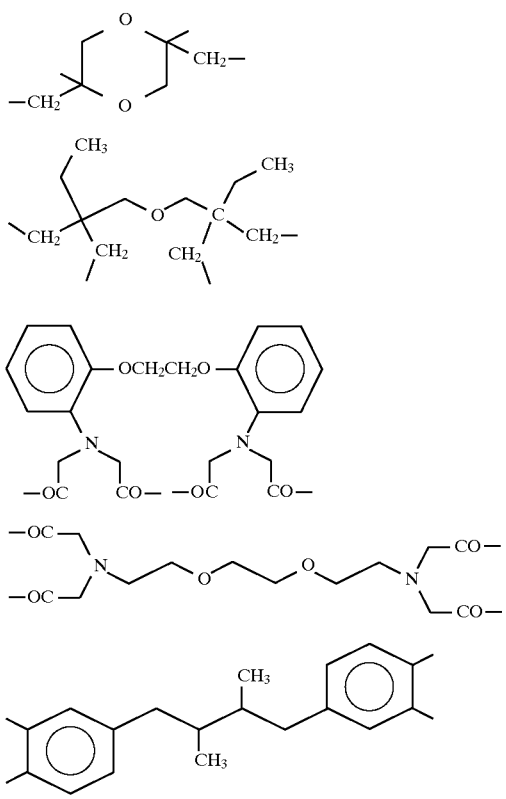

4. The macromolecule according to claim 1 in which S is selected from: halogen, OH, SH, $NH_2$, CHO, CN, COOH and salts thereof, in free or modified form, being the modifying groups selected from acetal, ketal, ester or ether, in particular methylthiomethylether, 2-methoxyethoxymethylether, tetrahydrothiofuranylether, thioester, thioether, carbamate, amide, cyclic imide, tosyl, $SO_2CH_3$, $SO_2CH_2CF_3$, $SO_2CF_3$; or a group deriving from the oxidation or reduction of one of said functional groups.

5. The macromolecule according to claim 1 in which B is a branching point corresponding to a polyvalent aliphatic residue comprising m functional groups that are suitable for attaching the next repetition unit, where m is defined as above.

6. The macromolecule according to claim 1 in which the length of the polyoxaethylene/polyoxapropylene chains is the same for each growth level of the macromolecule and is the same or different for different growth levels.

7. The macromolecule according to claim 1 in which the address molecules conjugated through S are: hormones, amino acids, peptides, proteins, enzymes, antibodies, antigens, nucleotides, polysaccharides, sugars, lipids, enzymic substrates.

8. The macromolecule according to claim 1 covalently conjugated by means of S, through a suitable spacer, to at least a second molecule of formula (I).

9. The macromolecule according to claim 1 covalently conjugated by means of S, optionally through a suitable spacer, to a polyfunctional structure.

10. The macromolecule according to claim 1, in which:
z=1
v=3
the "core" C is a neopentyl residue of formula:

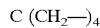

each growth level apart from the last comprises residues of formula

—P'—B'— in which
P' is a polyoxaethylene chain of formula:

in which n is variable between 0 and 15, with the condition that in at least one growth level n is different from 0,
B' is a branching point, having a branching multiplicity of 2 or 3, of formula:

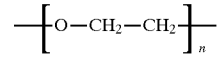

or

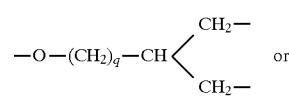

in which q is an integer variable between 0 and 4, and in which
the final growth level is composed of residues of formula:

P'—B'[T]₂₋₃' in which T is defined as above and B' may also be a simple bond in which case the final growth level comprises residues of formula:

P'—T,

S is one of the groups: halogen, CHO, CN, COOH, $NH_2$, OH, OTs, $OSO_2CH_3$, $OSO_2CH_2CF_3$, $OCH_2CHO$, $OCH_2COOH$, $OCH_2CN$.

11. The macromolecule according to claim 1, in which:
z=0
v=4
the "core" C is a neopentyl residue of formula:

C (CH₂—)₄ three of the "dendra" D are composed of repetition units of structure

—P'—B' and of final growth level units of structure

—P'—B'[T]₂₋₃ or P'—T, in which P', B' and T are defined as in claim 1 and one "dendron" D includes, in whichever position of the same, at least one residue

—P'—S in which P' and S are defined as above.

12. The macromolecule according to claim 1, selected from the following classes of compounds:

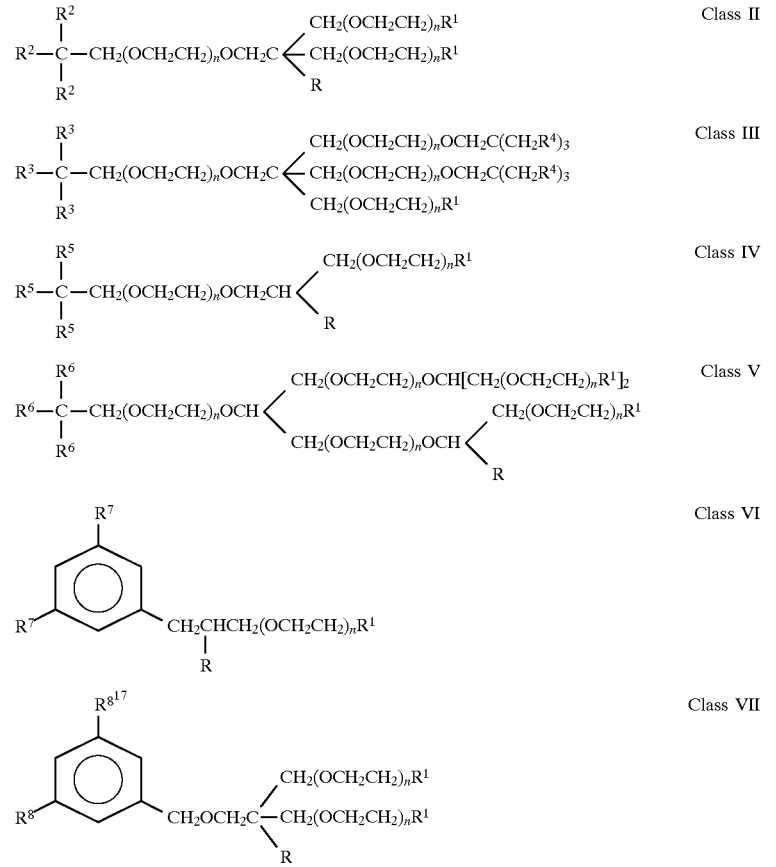

where n=0–6
$R=CH_2OH$, $CH_2OSO_2CH_3$, $CH_2OSOCH_2CF_3$, $CH_2OSO_2CF_3$, $CH_2OTs$, CHO, COOH, $CH_2CN$, $CH_2SH$, $CH_2NH_2$, CN,
$R^1$=halogen, OH, O-pyranyl, OTs, $NH_2$, CN, SH, $OCH_2CHO$, $OCH_2COOH$,
$R^2=CH_2(OCH_2CH_2)_nOCH_2C[CH_2(OCH_2CH_2)_nR^1]_3$
$R^3=CH_2(OCH_2CH_2)_nOCH_2C[CH_2(OCH_2CH_2)_nOCH_2C(CH_2R^4)_3]_3$
$R^4$=H, orthoester, $R^1$
$R^5=CH_2(OCH_2CH_2)_nOCH_2CH[CH_2(OCH_2CH_2)_nR^1]_2$
$R^6=CH_2(OCH_2CH_2)_nOCH[CH_2(OCH_2CH_2)_nOCH[CH_2(OCH_2—CH_2)_nR^1]_2]_2$
$R^7=CH_2CH[CH_2(OCH_2CH_2)_nR^1]_2$
$R^8=CH_2OCH_2C[CH_2(OCH_2CH_2)_nR^1]_3$.

13. A process for the preparation of a macromolecule of formula (I) according to claim 1 characterized by the following synthetic steps:
a) reaction of the reactive functions of the "core" with polyoxaalkylene lengthening units, in which said polyoxaalkylene chains have one end functionalized with reactive groups that are able to react with the "core", forming C—O bonds with the same, while the terminal group(s) of the opposite end are suitably protected, being this reaction performed in such a way that at least one of the reactive groups of the "core" does not participate in the lengthening;

b) blocking of the "core" residue/s that have not participated in the lengthening with a suitable modification or protection (alternatively said residue/s can be selectively protected or modified before introducing the polyoxaalkylene chains according to step a));

c) selective deprotection of the terminal groups of the polyoxaalkylene chains, and reaction of these, either as they are or following activation, with a reactive group of a branching unit, in which the other reactive functions are suitably protected;

d) selective deprotection of these protected functions of the branching units and subsequent reaction with the polyoxaalkylene units of the successive growth level;

e) repetition of steps c) and d) by using the most properly selected polyoxaalkylene chains and branching units, until the desired macromolecule is obtained;

f) deprotection and possible subsequent functionalization of the unreacted group/s of point b), directly or via a spacer, with the desired address molecules or with at least another molecule of formula (I).

14. A process for the preparation of a macromolecule of formula (I) according to claim 1 characterized by the following synthetic steps:

a) reaction of all the reactive functions of the "core" with the desired polyoxaalkylene lengthening units in which said polyoxaalkylene chains have one end functionalized with reactive groups that are able to react with the "core", forming C—O bonds with the same, while the terminal group/s of the opposite end are protected, b) deprotection of the terminal groups of the polyoxaalkylene chains, and reaction of these, either as they are or following activation, with a reactive group of a branching unit in which the other reaction functions are suitably protected;

c) deprotection of these functions and subsequent reaction with the polyoxaalkylene units of the successive growth level;

d) repetition of steps b) and c) until the desired macromolecule is obtained, with the condition that at least one of the terminal groups of the lengthening units of the branching units, at whichever growth level, does not participate in the growth and is possibly suitably blocked by means of modification or protection;

e) deprotection and possible subsequent functionalization of the group/s that have not participated in the growth, analogously to step f) of claim 13.

15. The method of preparing a contrast media for diagnostic imaging of at least one of a specific organ and tissue, which comprises including in said contrast media a macromolecule according to claim 1.

16. A pharmaceutical composition for the controlled release of an active ingredient which includes a macromolecule according to claim 1.

17. The method of preparing an organ or a tissue specific pharmaceutical/diagnostic formulation for use in nuclear medicine, which comprises including in said formulation a macromolecule according to claim 1.

18. A carrier for a drug or a contrast agent for diagnostic imaging which comprises a macromolecule according to claim 1, said drug being conjugated or entrapped within said macromolecule.

19. A vehicle of radioactive metallic species in radiology which comprises a macromolecule according to claim 1.

* * * * *